March 28, 1961     R. M. BLOCH     2,977,047
ERROR DETECTING AND CORRECTING APPARATUS Filed Dec. 13, 1957     6 Sheets-Sheet 1

INVENTOR.
RICHARD M. BLOCH
BY
ATTORNEY

March 28, 1961 R. M. BLOCH 2,977,047
ERROR DETECTING AND CORRECTING APPARATUS
Filed Dec. 13, 1957 6 Sheets-Sheet 2

INVENTOR.
RICHARD M. BLOCH
BY Henry L. Hanson
ATTORNEY

March 28, 1961 R. M. BLOCH 2,977,047
ERROR DETECTING AND CORRECTING APPARATUS
Filed Dec. 13, 1957 6 Sheets-Sheet 5

INVENTOR.
RICHARD M. BLOCH
BY Henry L. Hanson
ATTORNEY

March 28, 1961  R. M. BLOCH  2,977,047
ERROR DETECTING AND CORRECTING APPARATUS
Filed Dec. 13, 1957  6 Sheets-Sheet 6

INVENTOR.
RICHARD M. BLOCH
BY Henry L. Hanson
ATTORNEY

United States Patent Office 2,977,047
Patented Mar. 28, 1961

2,977,047

ERROR DETECTING AND CORRECTING APPARATUS

Richard M. Bloch, Newton, Mass., assignor to Minneapolis-Honeywell Regulator Company, Minneapolis, Minn., a corporation of Delaware Filed Dec. 13, 1957, Ser. No. 702,668

26 Claims. (Cl. 235—153)

A general object of the present invention is to provide a new and improved method and apparatus for the manipulating of information or data. More specifically, the present invention is concerned with a method and apparatus for manipulating digital information or data which is characterized by its ability to restore to original form information or data which may have been erroneously transferred or otherwise handled.

In data processing systems, particularly of the electronic type, the data is handled and manipulated at very high speeds. The data which is processed in the system is frequently in the form of time spaced electrical pulses, and is arranged in predetermined code forms to represent the numerals or characters that are being processed. Thus, each numeral or character may be represented in the well known form of binary type notation where each code will comprise preselected combinations of "ones" and "zeroes." Each element of the code may be designated as a binary digit or a bit. This form of code from the system standpoint is sometimes referred to as the system language, and all of the data processing within the system will be carried on in this language. The handling and manipulation of the system data may involve, in addition to other things, the transfer of the data within the processing system, or may involve the writing of the information into some storage medium and the subsequent reading of the information therefrom back to the system or to some output device. In the case of a data transfer within the processing system, it is always possible that, due to transients within the transfer equipment, or a failure of the equipment, the data will be transferred in error. In the event that data is to be written into some storage medium, or read therefrom, there is again the possibility that some condition on the medium, or in the associated circuits, may exist which will cause the data to be in error the next time that the data is needed. Recognizing the fact that such failures can and do occur in the data processing systems, various schemes have been proposed for sensing when data may be in error. Such a scheme for checking when an error is made in a data manipulating circuit is disclosed in a patent issued to the present inventor on April 7, 1953, bearing Number 2,634,052, and entitled "Diagnostic Information Monitoring System."

It is the basic function of such checking schemes, as heretofore used, to produce an error signal which may be used to stop the data processing machine so that corrective action may be taken by the operator, either by way of rerunning a portion of the processing problem underway, or by making such service adjustments on the equipment as may be required to eliminate the source of the error. It will be readily apparent that any error which requires human intervention can be extremely wasteful in time and expense in any type of data processing machine. To take care of this deficiency, it has been proposed that corrective action may be achieved by the use of very special codes, sometimes referred to as redundant codes. These redundant codes are so arranged that if an error occurs within a particular character, the redundancy of the code for that character may be used to generate a code which properly represents the desired character. These codes, however, are not readily adapted for use in anything but specialized types of circuits and further do not protect against anything but the most simple type or error. Thus, for example, if the code for a complete numeral or character should be lost, which is frequently the case when there is a failure or an error, there is no way of reconstructing the information lost without going all the way back to the original source of the data. Such a scheme, then, does not satisfy the needs for correcting errors when one or more characters are missing from the data, nor does it recognize the extent to which errors have occurred.

In accordance with the principles of the present invention, it is possible to detect errors that may be made in the manipulating of information and further take action to restore it to its original form when an error is detected. This information restoration may be achieved even though a complete word, or a plurality of characters or numerals, may be completely absent from the information which is being handled. As will be apparent from the description that follows, a minimum of additional circuitry is required in order to achieve the advantages of the invention in any data processing system.

It is accordingly a further more specific object of the present invention to provide a new and improved method and apparatus for sensing the presence of an error in data being manipulated and restoring the data in error to its original correct form.

The principles of the present invention may be applied to numerous types of information handling or data processing systems whether it be digital computers, digital data processing systems, automatic telephone systems, telegraph systems, or the like. The greatest advantage of the invention may be realized with apparatus utilizing a plurality of information groups or machine words in a particular data handling problem. Thus, in each of the above listed systems, there are data handling problems involving a number of information groups where each group is a part of a whole problem, and these groups may be referred to as informational blocks. The number of individual groups within an informational block has little effect on the utility of the system for the reason that the checking and restoration system of the invention is readily adjusted to data handling problems of varying size. One area of data processing which is common to all of the above mentioned systems is the area of data storage. Data storage may be effected in several ways but that which is most common is by way of storage tapes. A tape widely used in present day data processing systems is magnetic tape.

Various methods of recording on magnetic tape and reading from magnetic tape are well known in the art. Heretofore, the only way to determine if the information written on tape was correctly written has been to read the information back from the tape and make a comparison of the information with that which had been recorded on the tape. This is very time consuming for the reason that most tape recording schemes have certain speed limitations that are mechanical rather than electronic speed limitations. Further, the detection of an error by such a comparison scheme merely requires that the error source be located and a new attempt be made to write the information correctly. Other schemes operating at electronic speeds have been proposed whereby the signals to be recorded on tape are examined right up to the point where the signals are applied to the tape. Here, however, there is no assurance that the tape was capable of receiving a signal or that some lint or dust may not have moved the tape out of the vicinity of the recording head so as to prevent the writing of a signal on the tape. It will be apparent that while certain checks can be built into such a system, these will require operator intervention before any correction can be made.

Utilizing the principles of the present invention, it is not necessary to check a recording made on tape at the time that it is made for the reason that a check can be made when the information is needed, and if an error has been made, the information may be restored to its original form. Thus, a tape when recorded on can be stored away with reasonable assurance that when the tape is needed it will be available with all of the information recoverable therefrom without error.

Still another object of the invention is, therefore, to provide a new and improved method and apparatus for use with a data recording scheme which will provide substantially error free information from the data which has been recorded and read back.

Any one information block, which contains a plurality of information groups or words, may be considered as being in two dimensions. For simplicity of analysis, each group or word may be considered to comprise a series of information bits and in this serial form defines the first of the two dimensions. When a group of words from a block are considered in parallel relationship, a second dimension has been defined. The information block may be examined for the presence of errors in one dimension and examined in the other dimension for generating the signals needed for restoring to correctness any word which may be in error within the block. In order to provide the necessary check in the first dimension, a suitable data monitoring scheme may be employed such as a parity check scheme for each word, or a more extensive weight count check scheme, both schemes of which are described in the aforementioned patent. When an error is sensed in one of the words in the first dimension, a signal may be created to initiate a restoration operation in accordance with the data in the second dimension of the block. The operation in the second dimension of the block is with respect to a special monitor word or group of bits which have been generated by the information when it was known that no error existed. This monitor word is hereinafter referred to as a restoration monitor. When each block of information is defined in any particular apparatus, a restoration monitor may be generated therefor and carried with or made available for use with the block. When an error is sensed in the first dimension of the block, certain references are made with respect to the restoration monitor and steps may be taken so that the word in error may be restored to its original correct form.

A further object of the invention is to provide a new and improved method and apparatus for restoring data in an information block by sensing the data in the block in a first direction for any errors and utilizing a restoration monitor for restoring the data in the block which may be found to be in error.

The restoration monitor may be generated by adding according to a predetermined modulo, or otherwise manipulating, the related bits in each of the words in a block. The resultant restoration monitor may be used as a reference word from which it is possible to restore to desired form data which may be in error or may be missing. The restoration monitor, which was generated from data known to have no errors, may be compared with respect to a control monitor, which has been generated in a manner corresponding to that of the restoration monitor, but by using the information known to be in error. The result of this latter comparison will be a restoration constant. Using this restoration constant and the word in error, and manipulating them in a predetermined manner, it is possible to create a new word which is in fact the word in error restored to its original correct form.

When the information block words are each checked for errors in the serial sense, they will be examined in the parallel sense for purposes of creating a restoration monitor and subsequently for creating the control monitor required for restoring any word that may be in error. Conversely, if the information block words are checked for errors in the parallel sense, they will be examined in the serial sense for creating a restoration monitor and a subsequent control monitor in the event of an error.

It is, therefore, a still more specific object of the invention to provide a new and improved information handling apparatus for a plurality of information groups wherein each group may be individually checked for the presence or absence of errors, and, in the event of an error, reference may be made to a restoration monitor assigned to the plurality of information groups, and to a control monitor generated from the groups wherein an error is found, to produce a restoration constant that may be used to directly restore the group in error to its desired form.

The foregoing and other objects of novelty of the invention are pointed out with particularity in the claims annexed to and forming a part of the present specification. For a better understanding of the invention, its advantages and specific objects to be obtained with its use, reference should be had to the accompanying drawings and descriptive matter in which there are illustrated and described preferred embodiments of the invention.

Of the drawings:

Figure 1 illustrates one feature of the invention relative to a record tape;

Figure 2 illustrates a further feature of the invention relative to a record tape;

Figure 3 illustrates another modification of the invention;

Figure 4 illustrates the principles of the invention applied in a sense opposite that of Figure 1;

Figure 5 illustrates the principles of the invention applied to a relatively wide record tape;

Figure 6:
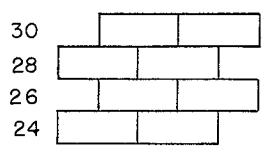
Figure 6 illustrates another feature of the present invention.

An understanding of the basic principles of the invention may be realized by reference to Figure 1. In this figure, the numeral 10 represents a data storage tape, such as a magnetic tape. The tape illustrated is shown to have eight information channels 1–8 and a further channel designated as the restoration monitor channel RM. In so far as the present description is concerned, it is assumed that the information written in each of the channels 1–8 is a machine word comprising a plurality of bits arranged to represent certain digital information. At the end of each of the words in each channel is a check code C which may take the form of a simple parity bit or a more complex weight count, either of which may have been generated in accordance with the principles set forth in the aforementioned patent, prior to the time that the information was written on the tape 10.

As is well known in the art, the check code C may be used to give a direct indication if any error should occur within the machine word or character with which it is associated. This indication of error may be generated by examining the code of the word with respect to a further code generated from the bits of the word to see if there is agreement. If there is no agreement between the two codes, an error signal will be produced. As mentioned above, it is known in the art to use such an error signal to stop a data processor and inform an operator that he must take steps to eliminate the error and possibly the source of the error. In more advanced systems the presence of an error may initiate a rerun operation to see if the error was transient and will clear. If not transient, the system will stop.

The restoration monitor RM which is located in the ninth channel of the tape is a special machine word by which it is possible to restore to original and correct form any word that may be in error in any other channel. This restoration monitor may be generated by a predetermined summing of the corresponding columnar, or time related, bits of individual words in the other channels. This summing scheme may be, for example, adding the "ones" in each column according to a predetermined modulo. The scheme most readily understood and readily accomplished in terms of circuitry is when the "ones" in any column are summed modulo 2. Thus, considering the first column of channels 1–8, if a "one" should be present in channels 1, 3, and 8, the modulo 2 sum of these bits would be a "one." This, then, would be the first columnar bit of the restoration monitor RM. Considering next the second column of the words in channels 1–8, if a "one" should be present in channels 2, 3, 6, and 7, the modulo 2 sum would be "zero." This then would form the second columnar bit of the restoration monitor RM.

It will be apparent that the foregoing summing scheme may be applied to all of the columns of the words in the channels 1–8 and when so applied, the restoration monitor RM will represent the modulo 2 sum of the bits of all of the columnar bits in this particular information group or information block.

Considering further the problems surrounding the use of magnetic tape for the storing of an information block as illustrated in Figure 1, the signals are normally written on the tape by way of a magnetic recording head having a plurality of individual channels corresponding to the channels to be recorded on the tape. For the configuration shown in Figure 1, a 9 channel head would be required. With such a head, there is always the danger that there may be a failure in the circuits feeding one of the channels or there may be short circuit at the head so that no signal is recorded in the associated channel. Further, in connection with the reading of the information from the tape, the recording head may also be inoperative, in one of the channels, or the associated amplifier circuitry may be inoperative. Another common difficulty is that of lint or dust getting between the head and tape to cause the head not to write a particular bit or character and/or not to read a particular bit or character. In addition, transient conditions may occur which will cause a partial loss of data in a channel, or possibly the complete loss of data in the channel. These difficulties represent some of the more frequently encountered difficulties associated with the storage of data on magnetic tape. It will be apparent that the occurrence of any one of these difficulties will render the information taken from the tape of no value unless the information can be recovered in some other way. In some data processing installations, when an error is detected, the data in error will be printed out. From the printed record, an operator will try to reconstruct the data by visual inspection and personal knowledge of what the data should be, or possibly making reference to original source data. In accordance with the principles of the present invention, the lost data may automatically be restored into its correct form.

By way of example, it is assumed that the block of information recorded on the tape 10 of Figure 1 has eight names therein, one for each of the eight channels. The names, channels, and coding therefore are assumed as follows:

|       | Word                                                                 | Weight Count |
|-------|----------------------------------------------------------------------|--------------|
| Ch. 1 | J       A       M       E       S<br>100001 010001 100100 010101 110010 | 0100 |
| Ch. 2 | W       H       I       T       E<br>110110 011000 011001 110011 010101 | 0001 |
| Ch. 3 | A       L       L       E       N<br>010001 100011 100011 010101 100101 | 0111 |
| Ch. 4 | S       M       I       T       H<br>110010 100100 011001 110011 011000 | 0011 |
| Ch. 5 | B       A       T       E       S<br>010010 010001 110011 010101 110010 | 0100 |
| Ch. 6 | E       A       R       L       E<br>010101 010001 101001 100011 010101 | 0110 |
| Ch. 7 | J       A       S       O       N<br>100001 010001 110010 100110 100101 | 0100 |
| Ch. 8 | H       O       L       L       Y<br>011000 100110 100011 100011 111000 | 1000 |
| RM    | 001010 111001 001100 110011 100000                                   | 1111 |

The weight counts in each of the channels 1 through 8 may be produced by summing the bits of the words in each channel modulo 9 when the bits are sequentially weighted in accordance with a 1, 2, 4 and 8 scheme. Such a weight count generating scheme is described in the above-mentioned patent of the present inventor.

The restoration monitor is generated by adding the related columnar bits of all of the words. In the example shown, the adding scheme assumed has been an adding modulo 2, without carry. This has sometimes been referred to as a half adding scheme. Thus, the first column bits in the left hand side may be added. Since there are four "ones" in this column, the addition, modulo 2, will be "zero." Adding in the other columns in the above manner will produce the restoration monitor in the form that is shown in the above table. It is next assumed that there has been a failure in channel 4 which failure has caused the word "WRONG" to be erroneously recorded in that channel instead of the desired and correct word "SMITH." This error in recording would normally not be detected until the data on the tape was read therefrom into some utilization device. When so read, it is customary to check each transmission from the reading device to see if an error has been made. This checking is generally done by way of a check monitor which is appended to the data at some predetermined point, as shown and described in the above mentioned patent. The check monitor may well be a parity or modulo 2 count of the bits in each word, or it may be a more extensive weight count, such as a modulo 9 weight count. As is well known, the larger the modulo used in the weight count, the greater the checking accuracy to be achieved by the check monitor. In the above table, the check monitor is assumed to be a modulo 9 weight count. Thus, the weight count for the word "SMITH" will be a binary coded 3 or 0011. As the word "WRONG" was assumed to have been written in place of "SMITH," when the block is read from the tape, the transfer check circuits will sense that an error has occurred in channel 4. The presence of the error will be detected because the weight count for the word "WRONG" will be a binary coded decimal 7 which will mean that a check weight count generated from the word "WRONG" will not agree with the weight count of 3 which is transferred with the word "SMITH" and which was written in the channel 4 location. Thus, once an error is detected, it is desirable to take steps to restore the word in channel 4 to its desired form.

The first step in this restoration process is the generation of a control monitor. This control monitor is generated by the same columnar adding of all of the related bits in all of the words of the block, except that in this case, the word "WRONG" has been erroneously substituted for "SMITH." The result of this will take the following form in the assumed example.

CM=001110  110100  110011  100101  101111

The second step in the restoration process is the generation of a restoration constant RC. This constant is produced by half adding the restoration monitor RM and the control monitor CM. The result of this will be:

RC=000100  001101  111111  010110  001111

The third and final step in the restoration process is the actual restoration step which comprises half adding the restoration constant RC to the word in the channel where the error was detected. Thus in the present example, the above RC is half added to the word "WRONG." The complete half adding step is as follows:

| RC | 000100 | 001101 | 111111 | 010110 | 001111 |
|---|---|---|---|---|---|
| "WRONG" | 110110 | 101001 | 100110 | 100101 | 010111 |
| Result | 110010 | 100100 | 011001 | 110011 | 011000 |

An examination of the latter code indicates that it corresponds to the code for the word "SMITH" from the above table, which is the word originally present in its errorless form.

The foregoing may be applied to any other one channel wherein an error has occurred. The error in that channel may even be the complete absence of information. Under these circumstances, the apparatus will still restore to its proper location and form that word which was used to create the original restoration monitor, and which had been lost. It will be readily apparent that when the foregoing system is utilized it is possible to continue operation of the data processing apparatus without the necessity of going back to the source of the difficulty, or to a source of original data.

It will be noted that the weight count section of the restoration monitor was generated from the weight count positions of the words. This will permit the restoration of the weight count of any one of the words if it should be that the weight count is in error, as well as the associated word. The principles explained above are equally applicable to this type of error, and may be corrected in the same way.

The manner in which the data and the restoration monitor are manipulated with respect to the tape will depend on the nature of the system that uses the same. Thus, an apparatus using a tape as in Figure 1 might well be arranged to write in the eight information channels and also in the restoration monitor channel. The utilization apparatus in reading the tape may read only the eight information channels and do nothing about the restoration monitor until such time that an error is detected in the information channels. A subsequent tape read order may then be made to read the restoration monitor so that the information in error may be restored. It will also be apparent that the arrangement of the information channels and the restoration monitor may be such as to provide maximum security of the monitor and the information. Thus, the RM of Figure 1 may be placed in the center channel on the tape if the tape handling mechanism should be error prone in the outer channels.

A greater amount of protection may be achieved by the arrangement of the information as shown in Figure 2. Here, two restoration monitors are provided, RM-1 and RM-2. In this scheme, the restoration monitor RM-1 may be generated by the aforedescribed summing of the related bits of the data in channels 2, 4, 6, and 8. The restoration monitor RM-2 will then be generated from the remaining words 1, 3, 5, and 7. It will be apparent, with this arrangement of the data, that no two adjacent channels are associated with the same restoration monitor. Further, the restoration monitors are separated from the data used to generate the same by at least one intervening channel.

In the event that an error occurs in two adjacent channels, channels 3 and 4 for example, the two restoration monitors may be used to restore the data. Thus, RM-1 will be used to restore the data in channel 4 while RM-2 will be used to restore the data in channel 3. The steps for this restoration will be as described above for an error in the data associated with one of the channels in Figure 1.

It will be apparent that if an error should occur in channel 8 and in the restoration monitor RM-2 that the aparatus would still be able to function. Here, the restoration monitor RM-1 may be used to restore to errorless form the word in channel 8. The restoration monitor RM-2 will not be needed since it is not associated with any word in error. This concept may also be extended to the data in channel 1 and the restoration monitor RM-1. Here, RM-2 will be used to restore the data in channel 1 and the restoration monitor RM-1 may be disregarded.

The restoration monitor may be generated by various other schemes such as summing the bits from related columns modulo 4. This will mean that the restoration monitor will be comprised of two bit positions for each columnar summing and consequently the total number of bits will be twice as many bits as the longest word in the words that are being manipulated. It will be apparent that the words may not be of the same length. Where the words are of different length, the columnar spaces not a part of a word may be considered as zeros. The recording of such a restoration monitor on a tape may be as represented in Figure 3. Here, two machine words or information groups are recorded in each channel. This will mean, with an eight channel information tape, that 16 words may be written in the channels. Further, one restoration monitor may be used for all 16 words. It will be readily apparent that more restoration monitors may be used as suggested by the arrangement of Figure 2.

If desired, the arrangement of the data on the tape in Figure 3 may be modified so that only one word is recorded in each channel and the restoration monitor recorded in a single channel. This method will not be the most efficient in terms of tape useage for the reason that the restoration monitor will be greater in length than the words. However, this may be overcome by breaking the restoration monitor into two sections and recording it in two channels.

In the Figures 1, 2 and 3, it has been assumed that the information has been arranged so that each group of bits for related information have been recorded serially along the length of the tape. The principles of the invention are equally applicable to the parallel recording of characters along the tape. Thus, in Figure 4, there is illustrated a tape having 10 characters recorded along the length of the tape with each character being recorded transversely of the tape. Further, each character has a parity or check bit C associated therewith. At the end of the block of characters is a restoration monitor RM-1 which is also recorded across the tape. The detection of an error in any one of the characters may be used to initiate a restoration operation in the manner described above. This method of recording of data and restoration monitor on tape is somewhat less desirable than that described with respect to Figures 1, 2, and 3 for the reason that if one of the recording heads for a particular channel should become inoperative, there may be an error in all of the characters and most likely in the restoration monitor, thus rendering the restoration impossible. However, the principles of restoration are no different than described above for an error in any single character.

A more extensive application of the principles set forth above are illustrated in Figure 5. In this figure, 36 channels on a recording tape are illustrated. Channels 0–30 are the information channels while three additional channels M1, M2, and M3 are the block mark channels which are adapted to carry signals to define the limits of the blocks on the tape. The two remaining channels are used for the restoration monitors, RM–1 and RM–3 in the first column and RM–2 and RM–4 in the second column.

The restoration monitors may be positioned on the tape so that the words used to generate the restoration monitors are always displaced from each other by at least one channel and are also displaced from the monitor by one channel. Thus, the restoration monitors RM–1 and RM–2 may be associated with the information recorded in channels 0, 2, 4, 7, 8, 11, 12, 15, 16, 19, 20, 23, 24, 27, and 28. The restoration monitors RM–3 and RM–4 may be associated with the information in channels 1, 3, 5, 6, 9, 10, 13, 14, 17, 18, 21, 22, 25, 26, 29, and 30. It will be apparent that other arrangements of data on the tape be adapted to the particular type of recording system used.

It will be understood that if there should be a loss of data or an error in channel 2, the words would be restored to errorless form by the restoration monitors RM–1 and RM–2. This would be so even though the error might extend to an error in the restoration monitors RM–3 and RM–4. Similarly, the affect of an error in channels 3 and 5 and the channel RM–A, where RM–1 and RM–2 are recorded, may be eliminated by reference to the restoration monitors RM–3 and RM–4.

One further method of recording that advantageously may be used with the present invention is that of staggering adjacent channels. Thus, the information may be recorded on the tape by a recording head having the adjacent recording channels staggered. This minimizes the interference between adjacent channels and further creates a separation which further protects the data recorded on the tape. Figure 6 illustrates one manner in which the adjacent channel information may be recorded in a recording system such as that shown in Figure 5. Thus, the channels 28 and 24 are shown to lead the information in channels 30 and 26. This separation of the channels at the leading and trailing edges minimizes the amount of adjacent tape area between channels where a tape flaw would cause an error in two adjacent channels. The staggering may be extended beyond that illustrated so that there is no overlapping of the information in adjacent channels of a given information block.

The type of circuitry required for automatically performing the restoration functions of the present invention will depend on the type of data manipulation desired to generate the restoration monitor. As pointed out above, there are many schemes available for regenerating the restoration monitor, such as modulo 2 summing, modulo 4 summing, and the like, of related bits in the information. One of the easiest ways to realize the advantages of the invention using single circuit techniques is that involving modulo 2 summing. The basic element of such a circuit may be that illustrated in Figure 7 where an exclusive "or" gate is shown with two input functions, A and B, these functions being available in both assertive and negative form. This gate will produce an output "1" or $f$ when the input A or the input B, but not both, is a "1." If neither A nor B is "1" or, both A and B are a "1," the output will be a "0" or $\bar{f}$.

Figure 7:
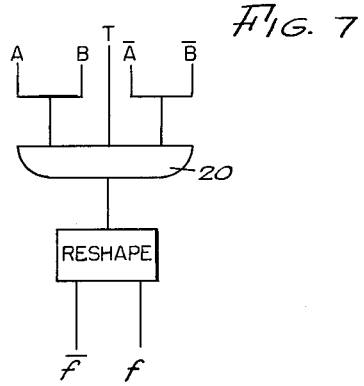
Figure 7 is a logical representation of a circuit element useful in implementing the present invention.

Considering the circuitry of Figure 7 more specifically, there is shown symbolically a logical gate 20 having three input gate legs, all of which have to be active at the same time in order for the output line $f$ to be active. One of the input gate legs has two inputs buffered thereto and these are the negations of the inputs on the other buffer lines or $\bar{A}$ and $\bar{B}$. The third gate leg may be a timing or clock gate leg to condition the gate only at selected times. Connected to the output of the gate 20 may be a reshape amplifier, the latter having two outputs, one which is an assertive output $f$ and the other of which is a negative output $\bar{f}$.

A representative form of buffer-gate circuit with reshape amplifier of the type illustrated may be that described in an article by Frank R. Dean, entitled "Basic Gating Package in Computing Operations," p. 14, Electronic Equipment, February 1956. Since the gate 20 functions as an exclusive "or" circuit, it may also be considered to be a modulo 2 adder or half adder of the functions on the input, A and B. Thus, if two serial trains of pulses were applied to the two buffer sections of the gate, and the gate were gated to be active by the timing gate leg T, the modulo 2 sum of the related bits on the input will appear on the output in assertive form at lead $f$ and in negative form at lead $\bar{f}$.

Figure 8:
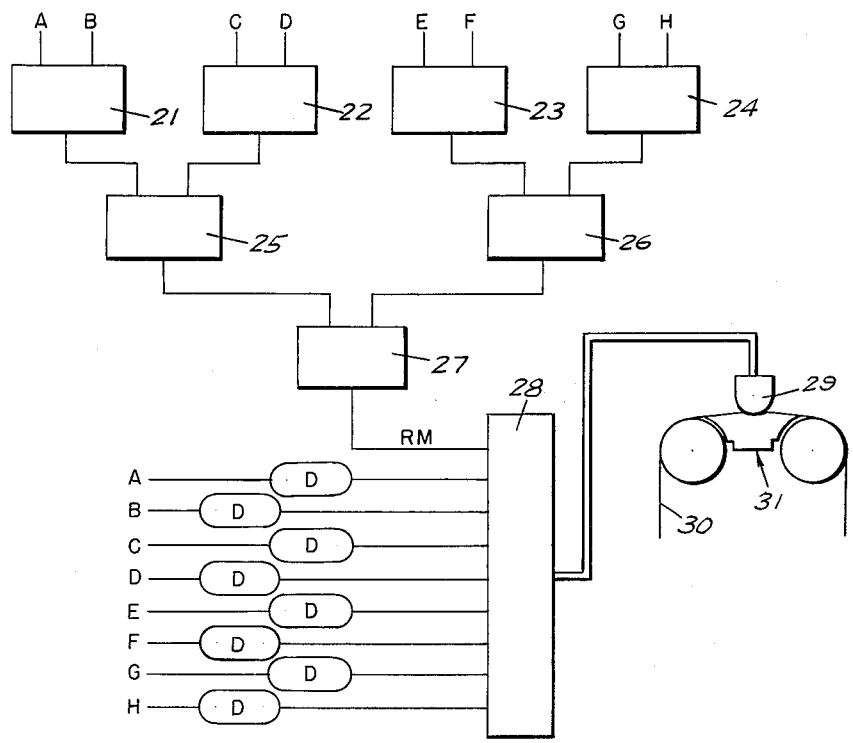
Figure 8 is a further logical circuit representation of the manner in which the information and its monitors may be handled and generated.

The modulo 2 summing circuit of Figure 7 is incorporated in each of the logical blocks 21, 22, 23, 24, 25, 26, and 27 in Figure 8. Thus, the inputs A and B are summed modulo 2 in block 21, the inputs C and D are summed modulo 2 in block 22, the inputs E and F are summed modulo 2 in block 23, and the inputs G and H are summed modulo 2 in block 24. The outputs of the four blocks may be written as A⊕B, C⊕D, E⊕F, G⊕H.

It will be understood that each of the blocks 21, 22, 23, and 24 must have the information available at the input in both the assertive and negative forms in order to perform the desired half adding or modulo 2 summing of the inputs. In other words, each of the blocks must have the general input and output configuration of the circuit of Figure 7.

With the outputs of the blocks 21 and 22 connected to the input of the block 25, this latter block will have an output which will take the following form:

$$A \oplus B \oplus C \oplus D$$

Similarly, with the blocks 23 and 24 connected to the input of the block 26, this latter block will have an output which will take the following form: E⊕F⊕G⊕H. It will also be apparent that with the two blocks 25 and 26 connected to the input of the block 27 that this latter block will have on its output the half added sum of all of the input functions A through H inclusive and that this output may be represented as $$A \oplus B \oplus C \oplus D \oplus E \oplus F \oplus G \oplus H$$

This latter output function will correspond to the function RM, or the restoration monitor for the bits from the inputs A through H inclusive. It may be assumed, for example, that the functions A through H inclusive correspond to the eight words used above in Figure 1 in describing the principles of the present invention. It is assumed that, when these eight functions are applied to the inputs A through H inclusive, they are accompanied by a suitable check monitor which may have been generated and appended thereto as taught in the above mentioned patent. Thus, the restoration monitor RM may have bit positions, and representations, indicative of the half adding of the check monitor bits as well as the information bits.

The restoration monitor RM is shown feeding into a suitable storage register and transfer circuit 28 along with eight other inputs A–H which feed through delay circuits so that the related bits in the information and the monitor will arrive at the circuit 28 at the same time. The transfer circuit 28 may be used to feed the signals, in appropriate form, to a multi-channel magnetic recording head 29 so that the data and the monitors may be recorded on a magnetic tape 30, the latter being controlled in its movement past the recording head by a suitable tape transport mechanism 31. The data and monitors when recorded may be in the block forms illustrated in Figures 1–6, depending on what other circuitry may be added similar to that illustrated in Figure 8 for purposes of supplying added signals and restoration monitors for the more extensive recording systems.

Figure 9:
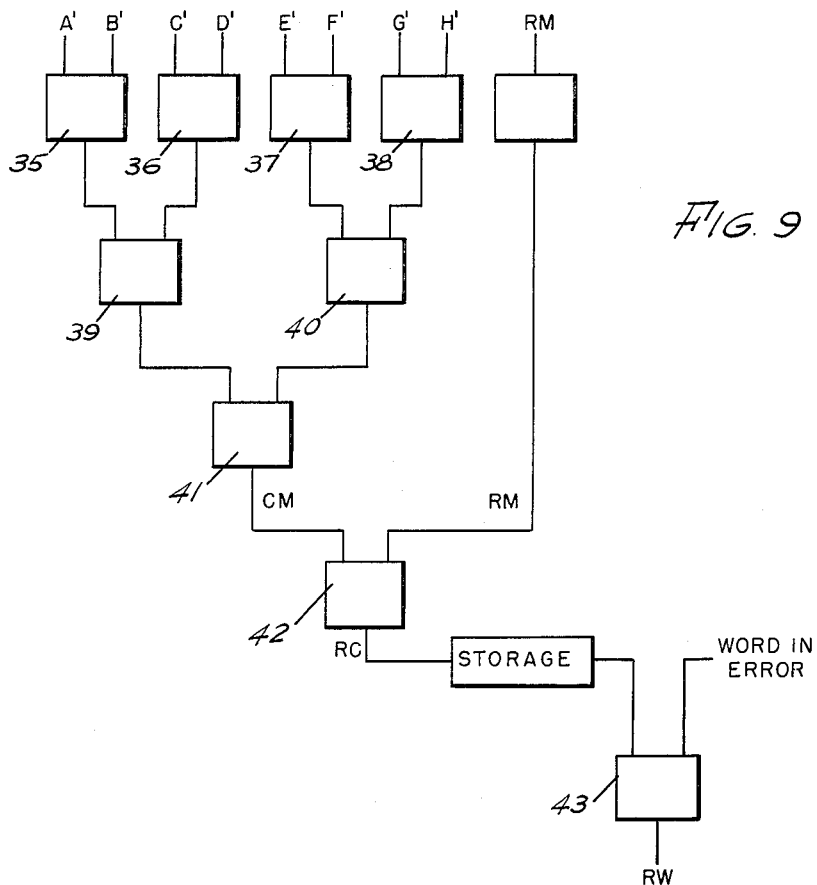
Figure 9 is a logical representation of a complete restoration circuit.
Figure 10:
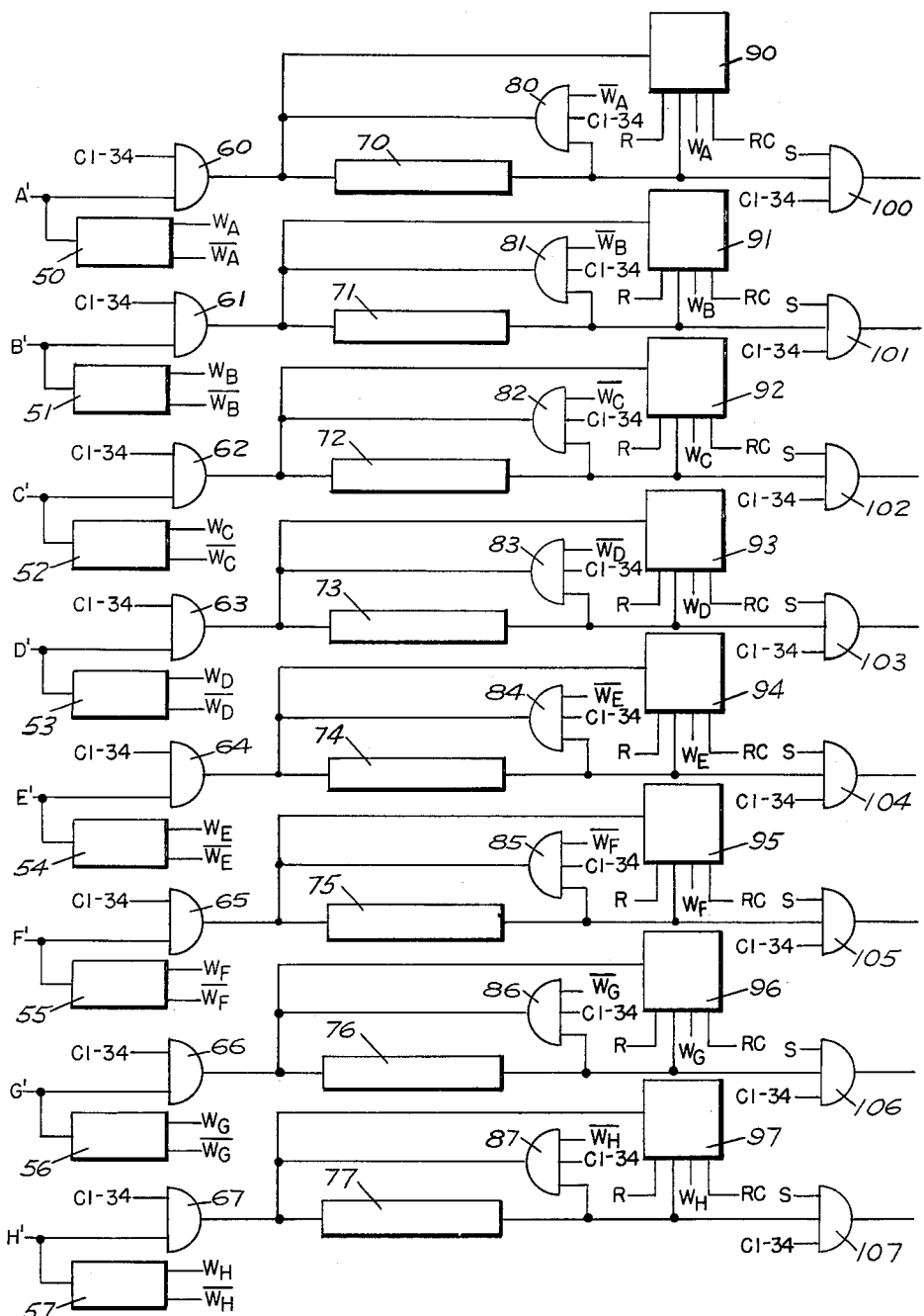
Figure 10 illustrates diagrammatically a circuit for processing a series of information groups.

When the information is read from tape and is to be used, it may be read by a suitable magnetic recording means well known in the art into a storage and check circuit such as is illustrated in Figure 10. However, before discussing in detail the circuit of Figure 10, reference is also made to Figure 9 where the basic elements of the restoration circuit of the invention are illustrated. It is assumed here, and in the figures that follow, that the functions A'–H' correspond to the functions A through H inclusive, except that they have been read from tape and are about to be processed for further use. Thus, the inputs to the circuit of Figure 9 are A' through H' inclusive.

As the data is read from tape, it may be applied directly to a circuit which will go through the process of generating a control monitor CM by the half adding of the corresponding bits of the input information. Thus, the blocks 35, 36, 37, and 38 may be half adding circuits as in Figure 7 and may be used to make the initial manipulation for producing the following sums: $A' \oplus B'$, $C' \oplus D'$, $E' \oplus F'$, and $G' \oplus H'$. The blocks 35 and 36 feed a further half adder block 39, the latter having an output which is $A' \oplus B' \oplus C' \oplus D'$. The blocks 37 and 38 feed a further half adder block 40, this latter block having an output $E' \oplus F' \oplus G' \oplus H'$. The outputs of the blocks 39 and 40 are half added again in the block 41 to produce on the output the desired control monitor CM which is representative of the information read from the tape. This control monitor will take the form of $A' \oplus B' \oplus C' \oplus D' \oplus E' \oplus F' \oplus G' \oplus H'$. When the control monitor CM and the restoration monitor RM are applied together by way of a half adder, such as represented by the block 42, the output will be CM⊕RM or a restoration constant RC. If there has been no error, the restoration constant RC will be a series of zeros. However, if there has been an error, the restoration constant RC will take the form of a series of ones and zeros which, when half added with the word in error in a further half add circuit 43 will produce the desired or restored word in the output thereof. Thus, RC⊕ "word in error" equals the restored word.

Figure 11:
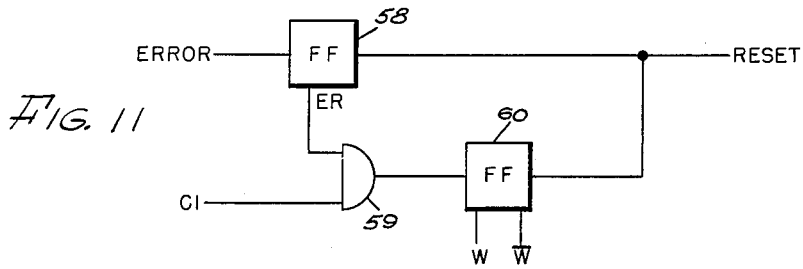
Figure 11 illustrates circuitry for use with the check monitors carried by the information manipulated.

The manner in which the complete checking and restoration function may be carried out is illustrated in greater detail in Figure 10. Here, the inputs will be the functions A' through H' inclusive. Each of the functions will be applied to its own error checking circuit 50 through 57 respectively, the latter functioning in the manner described in the above mentioned patent to produce an error signal if there has been a transfer where the weight count or parity bit does not agree with the information actually transferred. The error signal from the above mentioned patent may be used as illustrated in Figure 11 where the signal will set a flip-flop 58 if an error occurs. This flip flop 58 may, by way of its output ER activate a gate 59 on the input of a further flip flop 60. The other input to the gate 59 may be a clock pulse C1 which will not appear until it is desired to sample the status of the error flip flop 58. Once the flip flop 60 has been set, the output line W will be active to indicate that an error has occurred. If there has been no error detected, the output line $\bar{W}$ will be active. Each of the flip flops 58 and 60 have reset lines that are activated after each major transfer and restoration cycle, if any. With this type of circuit, an error in any of the inputs A' through H' inclusive will produce an error indication by way of the outputs $W_A$ through $W_H$ inclusive.

The inputs A' through H' inclusive are also each connected to a gate circuit leading to a word storage circuit. These input gate circuits are identified by the numerals 60–67. The word storage circuits are identified by the numerals 70–77, and may comprise dynamic or recirculating type storage, or may be magnetic core storage, both types being well known in the art. The output of this storage may be to a recirculation gate, which is active when there is no error, a restoration circuit, or an output gating circuit. The no error recirculation gates are identified by the numerals 80–87. The restoration circuits are identified by the numerals 90–97. The output gating circuits are identified by the numerals 100–107.

Figure 12:
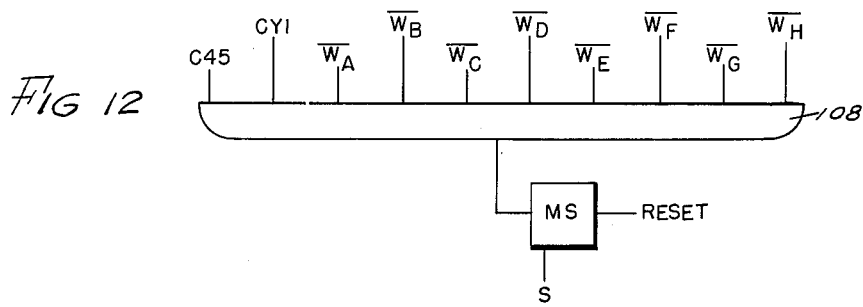
Figure 12 is a logical representation of the circuit for one of the sequencing modes of the present invention.

The direction of information flow from the storage circuits will be determined by the presence or absence of errors in the individual words. When there is no error detected in any of the words, the gate circuits 80–87 will be opened by the $\bar{W}$ functions. Further, if all the $\bar{W}$ functions are present, it is desired that this be specially indicated so that the output gates 100–107 may be opened. This will be achieved by the circuit of Figure 12 where a gate circuit 108 is illustrated. This gate circuit, upon the application of all of the $\bar{W}$ functions on the gate legs thereof, a cycle 2 signal CY2, and a timing signal C45 will produce a pulse by which the main sequence flip flop MS will be set. This will produce the signal S which may be used on the output gates 100–107, when the information in the registers 70–77 is to be transferred on to some other utilization circuit, not shown.

The presence of an error in one of the input words fed to the storage circuits 70–77 will be indicated by the associated checking circuitry, producing the output signal W. When one, and precisely one, W signal is detected, it is desired that the restoration operation be rendered effective. The detection of this one signal is by way of the circuitry illustrated in Figure 13. In this figure, there are illustrated a plurality of input gating sections 110–117. Each of these gating sections has an input from each corresponding error detecting section of Figure 10. The other gating inputs are timing inputs to insure that there is no interference between the sensing of the error circuits, and that the sensing is not done until the end of the checking operation. Each of the gating sections is connected to the same four stage binary counter 118, the latter having no end around carry. If one, and only one, of the input gates passes an error pulse to the output, the counter will have a "one" set therein. When so set, and with all the other stages than the first set to "zero," an output gate 119 will be conditioned to pass a signal to a restoration sequence flip flop RS. The setting of the flop RS indicates that the apparatus should go through to completion with the restoration operation and the output signal R from the flop RS will act on the appropriate restoration circuits 90–97 to provide the signal to initiate the completion of this operation.

If more than one word should be in error, when there is but a single restoration monitor, it is desired that the apparatus be stopped, or that at least a signal be given to an operator. This may be accomplished by a further flip flop 120, the latter having as an input the "ones" outputs of the three high order stages of the adder 118. Thus, if two, or more than two, errors have been detected, the counter 118 will be set to some value greater than one and this will cause the flip flop 120 to be set and an alarm signal to be generated.

Figure 14:
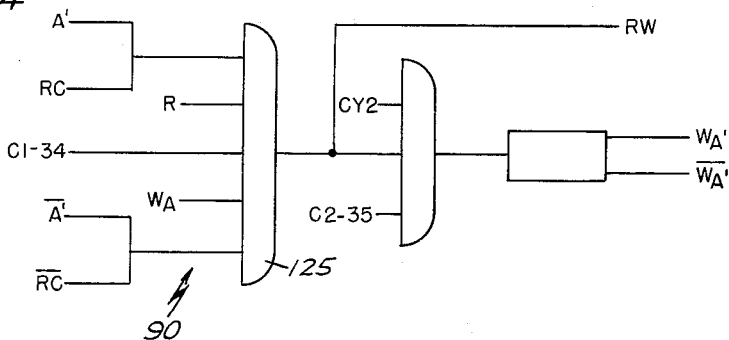
Figure 14 is a logical circuit representation of a portion of a restoration circuit of the invention.

Referring back to Figure 10, it will be noted that when the restoration circuits are activated by the restoration sequence signal R that at least one of the circuits will be activated by the related word error signal W. When the restoration constant RC is available, it will then be half added in the restoration circuit to produce the restored word. A typical half adding circuit 90 may be that which is illustrated in Figure 14 where the input is the A function. The half adder circuit 90 will be seen to comprise a gating circuit 125 having five input gate legs. The function A' is buffered together with the restoration constant RC on the first gate leg. The restoration sequence signal is applied to the second gate leg. A clock or timing signal is applied to the third gate leg. The negation of the input functions A' and RC in the form of $\bar{A}'$ and $\overline{RC}$ appears buffered together on the fifth gate leg. With this combination of signals present, it will be apparent that the output of the gate 125 will be the restored word for the reasons set forth in detail above. A weight count or parity check circuit may be provided on the output of gate 125 to produce the secondary check signals $\bar{W}'_A$ or $W'_A$.

Figure 15:
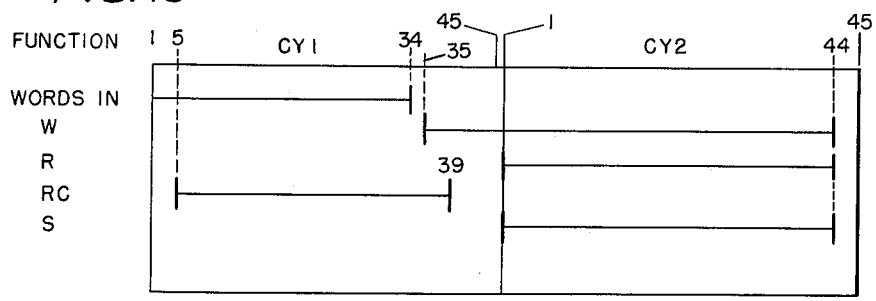
Figure 15 is a representative timing chart for the circuit of Figure 10.

The overall operation of Figure 10 should be considered with respect to the timing chart of Figure 15. For purposes of illustration, the operation is divided into two main cycles, CY1 and CY2. Each of these cycles may be divided into 45 pulse periods. The first cycle is used for reading the information into the storage circuits 70–77 and the sensing of the check circuits 50–57. The transfer in is made during the period of C1–C34. At the end of this time, at time C35, the check circuits will be sequentially examined in the gating circuits of Figure 13. These gating circuits will be opened if the associated word error signals W are present.

If none of the word error signals W are present, none of the gates will be opened and the $\bar{W}$ signals of the check circuits will open the gate 108 during cycle 2 to set the flip flop MS. The main sequence output signal S will then be acting on the output gates 100–107. This will mean that the signals in the storage circuits may be fed out through the output gates 100–107 during the second cycle CY2, at times C1–C34.

Figure 13:
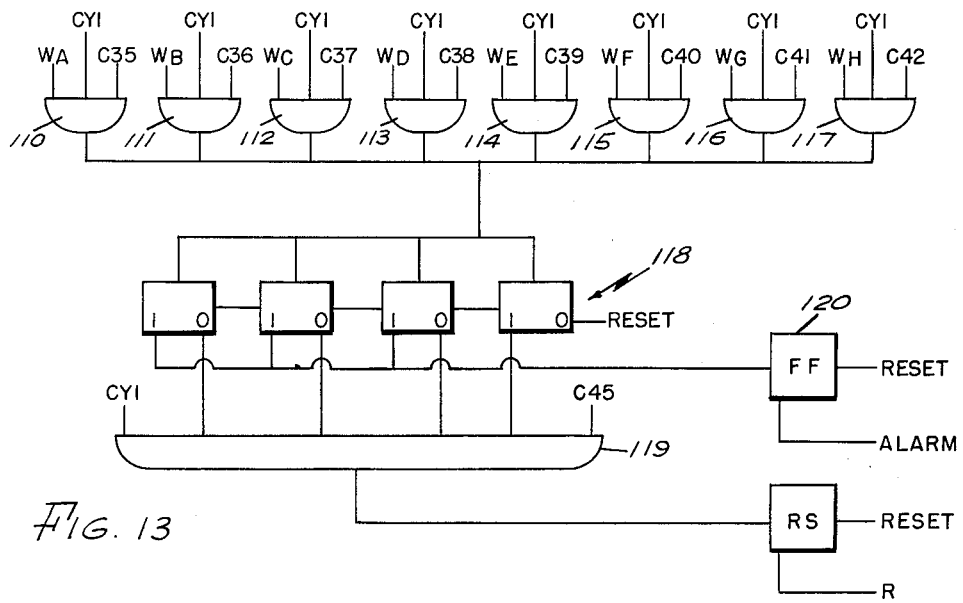
Figure 13 illustrates a further circuit for establishing a sequencing mode of the present invention.

If one error is detected, the gate 119 of Figure 13 will be opened and a set signal applied to the restoration sequence flip flop RS. The gate 119 will be conditioned to open at time C45 in CY1. This will mean that the restoration sequence signal R will be available at time C1 in CY2.

Another function performed during cycle CY1 will be the generation of the restoration constant RC, as in Figure 9. When generated, it will be placed in storage where it will be available in serial form when it is to be called out and applied to one of the restoration circuits 90–97.

Assume first that there is an error detected in the A function on the input transfer during cycle CY1. At time C35, the gate 110 of Figure 13 will be opened and the resultant signal passed through to the counter 118. The counter 118 will be set to a "one" and will, in the absence of any further errors, condition the gate 119 to be open at the end of cycle CY1 at time C45. Thus, the restoration sequence flip flop RS will be set and the output signal R will be applied to the restoration circuits 90–97. Since the only error detected was the one with the A function, the only restoration gate conditioned to be open will be that having the $W_A$ signal thereon, or the circuit 90. The remaining check circuits will all have their $\bar{W}$ output lines active. Consequently, the recirculation gates 81–87 will each be conditioned to pass the information back to the input of the storage registers 71–77.

With the foregoing circuits established, the A' function will pass through the restoration circuit 90 and the restored word will be written into the storage register 70. The functions B'–H' will all be recirculated back into their respective storage registers, 71–77.

Figure 16:
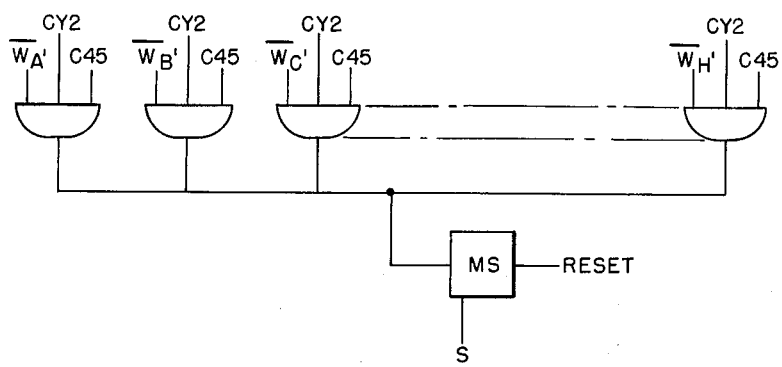
Figure 16 is a further circuit for implementing a sequencing mode of the apparatus.

As illustrated in Figure 14, there may be a checking circuit connected to the output of the word restoration circuit to check to see that the word restored checks out to be error free. The checking circuit in this instance will be as before, and as covered in the above mentioned patent. The presence of an error signal may be used to sound an alarm, or otherwise stop the associated circuitry. If no error is detected, the signal $\bar{W}_A$ may be used to condition or set the main sequence flip flop MS so that the output gates 100–107 will be opened in the following cycle. The circuit for effecting this may be as illustrated in Figure 16 where eight gating circuits are shown buffered together to the input or set side of the main sequence flip flop MS. Each gating section has its check circuit $\bar{W}'$ associated therewith in combination with the cycle signal CY2 and a timing pulse C45. Thus, regardless of which function may be restored, any one such function, if correct, will be able to set up the main sequence flop. Once set, the output gates 100–107 will be opened to pass the information in the registers on to some utilization circuit.

After the information has been transferred from the storage registers, either in cycle 2 when no restoration is required, or in the following cycle when restoration is required, the circuits may all be reset to prepare for the next input transfer.

The circuitry described above is representative of one of many possible ways of implementing the principles of the present invention. It will be apparent to those skilled in the art that existing data processing machines may be programmed to perform many of the functions performed by the above mentioned circuits. The initial generation of the restoration monitor by way of conventional programming means in certain data processing machines is possible, but will generally not be as practical as when accomplished by special circuits such as described above. The extent to which resort is made to the programming functions of a data processing machine for restoration purposes will be dependent on the frequency with which errors must be corrected. The use of the programmed portion of the machine will be economical only when the error frequency is low.

Another modification of the principles of the invention which will yield a higher rate of restoration is that where the information in one or more channels appears in more than one restoration monitor. Here, a certain amount of cross utilization of the monitors may be effected. Thus, referring to Figure 2, the word in channel 5, for example, might appear in both of the restoration monitors RM–1 and RM–2 while the word in channel 3 appears in RM–2 only. It can be shown that in this arrangement a double error; i.e., an error in both channels 3 and 5, may be resolved to bring both channels into errorless form. For example, if the words in channels 3 and 5 were in error in Figure 2, the word in channel 5 may first be restored by the restoration monitor RM–1. When restored, the error free word in channel 5 may now be used with the restoration monitor RM–2 to restore to errorless form the word in channel 3. This scheme will appear advantageous in those instances where one channel may be particularly prone to errors.

While there has been described preferred embodiments of the invention, it will be obvious that many changes may be made within the spirit of the invention. Consequently, it is intended that the scope of the present invention be limited solely by the appended claims.

What is claimed is:

1. A digital data restoration system for a plurality of groups of information, each group of which has a plurality of information bits and a check monitor bit representing a first selected summing of the bits in each group, means connected to sense all of said groups and generating a group of restoration monitor bits corresponding to a second selected summing of bits from all of said groups, error sensing means connected to sense the monitor bit of each group of information and produce an error indication if an error is detected in an information group, means activated by said error sensing means connected to sense said plurality of restoration monitor bits, and means including said last named means generating a restored group of information bits which represents the data in correct form to replace that group wherein an error was detected.

2. In a digital data restoration system for a plurality of groups of information, each group of which has a plurality of bits, means connected to sense said groups of information and generate therefrom a further group of bits representing a predetermined summing of bits of all of said plurality of groups of information, transfer error sensing means connected to sense each group of information transferred and to indicate any group which has an error detected therein, means connected to be activated by said error sensing means to sense said further group of bits, and means, including said last named means, when activated, connected to generate from said groups of information and said further group of bits a group of bits representing an errorless group to replace said group wherein an error was sensed.

3. In combination, a plurality of data storage means, each data storage means being adapted to store an information data group, a second data storage means adapted to store a first data monitor, said data monitor having been generated from a predetermined manipulation of all of the data groups which are stored in said plurality of data storage means, data sensing means connected to said plurality of data storage means to sense the presence or absence of an error in each of said data groups, control means connected to be activated by said data sensing means when an error is detected, said control means generating a second data monitor in accordance with said predetermined manipulation of all of said data groups, means connected to said control means and to said further storage means to generate a correction data group from a further predetermined manipulation of said first and second data monitors, and a data group restoration means comprising means connected to said last named means to sense said correction data group and that one information data group in error, said restoration means performing a further predetermined manipulation with said correction data group and said one information data group which is in error, the result of said manipulation being said one information group without error.

4. A digital data restoration system for use with a plurality of groups of information, each group of which has a plurality of information bits and a check monitor bit representing a first selected summing of the bits in each group, means connected to sense all of said groups and generating a group of restoration monitor bits corresponding to a second selected summing of bits from all of said groups, error sensing means connected to sense the monitor bit of each group of information and produce an error indication if an error is detected in an information group, means activated by said error sensing means connected to sense said plurality of restoration monitor bits, means including said last named means generating from said information groups wherein there is an error, a plurality of control monitor bits, a restoration constant generating means connected to sense said control monitor bits and said restoration monitor bits to produce a restoration constant, and means connected to sense that information group in error and said restoration constant to generate an error free information group to replace that which was in error.

5. In a digital data restoration system for a plurality of groups of information, each group of which has a plurality of bits, means connected to sense said groups of information and generate a further group of bits representing a predetermined manipulation of the bits of said groups of information, transfer error sensing means connected to sense each group of information transferred and to indicate any group which has an error detected therein, and means connected to be activated by said sensing means to generate from all of said groups of information and said further group of bits, a group of bits representing a restored group to replace said group wherein an error was sensed.

6. In a digital data restoration system for a data processor utilizing a plurality of digital data groups and having associated therewith a further data group produced by a predetermined summing modulo $n$ of the related bits in all of said plurality of data groups, data manipulating means, means connected to said manipulating means to sense each of said digital data groups, and indicate the presence or absence of an error in each group, control means connected to said last named means to be activated thereby when an error is indicated, said control means sensing said further data group and generating from said further data group and said group wherein an error is detected a restored data group to replace that data group wherein an error was sensed.

7. In combination, a plurality of data storage means, each data storage means being adapted to store an information data group, a second data storage means adapted to store a first monitor data group, said data monitor group having been generated from a predetermined manipulation in a first sense, of all of the data groups which are stored in said plurality of data storage means, data error checking means connected to said plurality of data storage means to check, in a second sense, the presence or absence of an error in each of said data groups, control means connected to be activated by said data sensing means when an error is detected, said control means generating from said data groups a second data monitor group in accordance with said predetermined manipulation in said first sense, means connected to said control means and to said further storage means to generate a correction data group from a further predetermined manipulation of said first and second data monitor groups, and a data group restoration means comprising means connected to said last named means to sense said correction data group and that one information data group in error, said restoration means performing a further predetermined manipulation with said correction data goup and said one information data group which is in error, the result of said manipulation being said one information group without error.

8. A digital data restoration system for a plurality of groups of information, each group of which has a plurality of bits, means connected to sense said groups of information and generate therefrom a further group of bits representing a predetermined summing of the bits of all of said groups of information, transfer error sensing means connected to sense each group of information transferred and to indicate any group which has an error detected therein, means connected to be activated by said error sensing means to sense said further group of bits, and control means, including said last named means when activated, connected to generate from said further group of bits, said groups of information and from that group which is in error a group of bits representing a restored group to replace said group wherein an error was sensed.

9. Apparatus for restoring digital data which may have been mutated from a corrected form into an erroneous form in the course of a data manipulation comprising means connected to generate from said data in its original desired form and in accordance with a predetermined summing scheme, a group of monitor bits, means connected to check said data after manipulation to determine if an error has been made in the manipulation, and to generate from said data after manipulation, if an error is detected, a second group of monitor bits in accordance with said predetermined summing scheme, means including said generating means connected to half add said first and second groups of monitor bits, and to half add the result of said sum with that data which is in error, the result of which represents the data in its original correct form.

10. In combination, a plurality of data storage means, each data storage means being adapted to store an information data group, a second data storage means adapted to store a first monitor data group, said monitor data group having been generated from a predetermined summing manipulation of the data groups which are stored in said plurality of data storage means, data sensing means connected to said plurality of data storage means to sense the presence or absence of an error in each of said data groups, control means connected to be activated by said data sensing means when an error is detected, said control means generating a second monitor data group in accordance with said predetermined summing manipulation of said data groups, means connected to said control means and to said further storage means to generate a correction data group from a further predetermined summing manipulation of said first and second monitor data groups, and a data group restoration means comprising means connected to said last named means to sense said correction data group and that one information data group in error, said restoration means performing a further predetermined summing manipulation with said correction data group and said one information data group which is in error, the result of said last summing manipulation being said one information group without error.

11. Apparatus for recording data on a recording medium where the data to be recorded comprises a plurality of information groups and a plurality of restoration monitors therefor comprising a data source, multiple channel recording means, and data distribution means connecting said data source to said recording means so that said information groups and the restoration monitors therefor are recorded in spaces on the recording medium so that no two information groups associated with one of said restoration groups will be in adjacent spaces.

12. Apparatus for recording data on a recording medium where the data to be recorded comprises a plurality of information groups and a plurality of restoration monitors therefor comprising a data source, multiple channel recording means, and data distribution means connecting said source to said recording means so that said recording means will record the information groups and the restoration monitors therefor in parallel channels on the recording medium, so that said restoration monitors and said information groups are spaced such that no two information groups associated with one of said restoration groups will be in adjacent channels, and said restoration monitors are recorded in channels separated from each other by at least one other channel.

13. Apparatus for recording data on a recording medium where the data to be recorded comprises a plurality of information groups and a plurality of restoration monitors therefor comprising means for recording the information groups and the restoration monitors therefor in parallel channels on the recording medium with adjacent channels being staggered.

14. In a data restoration system, transfer circuit means for a plurality of information groups, each of which comprises a plurality of bits that may be examined in a serial and a parallel sense, a further transfer circuit means for a restoration monitor group of bits, each bit of which represents a predetermined manipulation comprising the modulo 2 summing of the related bits of said data groups in one of said senses, checking means connected to sense each of said data groups in the other of said senses to indicate the presence or absence of an error in said data groups, and restoration means connected to said checking means and to both of said transfer circuit means to restore to errorless form that group wherein an error was detected.

15. In a data restoration system transfer circuit means for a plurality of information groups, each of which comprises a plurality of bits that may be examined in a serial and a parallel sense, a further transfer circuit means for a restoration monitor group of bits, each bit of which represents a predetermined manipulation comprising the modulo $n$ summing of the related bits of said data groups in one of said senses, checking means connected to sense each of said data groups in the other of said senses to indicate the presence or absence of an error in said data groups, and restoration means connected to said checking means and to both of said transfer circuit means to restore to errorless form that group wherein an error was detected.

16. In an information handling apparatus, the combination comprising a plurality of data transfer circuits, one circuit of which contains a restoration monitor and the other circuits of which contain words comprised of a plurality of information bits and a check monitor, error sensing means connected to said other circuits to produce an indication of an error in any one of said words, and means connected to said plurality of data transfer circuits to restore to errorless form any one word which may have been in error, said last named means comprising means to generate a control monitor from the data in said other circuits including that data group which is in error, means connected to said one circuit to manipulate said restoration monitor and said control monitor to produce a restoration constant, and means connected to sense said restoration constant and that data group in error to restore that data group to its errorless form.

17. A data handling system comprising apparatus for manipulating a block of informational bits such that the bits may be selectively related in two dimensions, a restoration monitor storage means adapted to store a predetermined bit configuration generated from those informational bits that are related in one of said dimensions, error checking means connected to said apparatus for checking each group of bits that are related in the other of said dimensions, control means connected to said apparatus to generate therefrom a control monitor by action upon the information bits in said one of said dimensions, and means connected to said restoration monitor storage means, said last named means, when actuated, creating a restored group of data bits where an error has been sensed.

18. In combination, an apparatus for manipulating a plurality of information bits that may be selectively related in two dimensions, means connected to said apparatus to generate from those bits related in one of said two dimensions a first information monitor, further means connected to said apparatus to generate from those bits related in the other of said two dimensions a second information monitor, and storage means connected to said apparatus to store said information bits and said information monitors as a related group.

19. Apparatus as defined in claim 18 wherein said storage means comprises a multiple channel record tape.

20. In combination, an apparatus for manipulating a plurality of information bits that may be selectively related in a serial and in a parallel sense, means connected to said apparatus to generate a first monitor by a predetermined summing according to a predetermined modulo those bits related in a serial sense, and means connected to said apparatus to generate a second monitor by a predetermined summing according to a predetermined modulo those bits related in a parallel sense.

21. In combination, an apparatus for manipulating a plurality of information bits that may be selectively related in a serial and in a parallel sense, means connected to said apparatus to generate a first monitor by a predetermined summing according to a predetermined modulo those bits related in a serial sense, and means connected to said apparatus to generate a second monitor by a predetermined summing according to a predetermined modulo those bits related in a parallel sense, and a storage means connected to said apparatus to store said information bits and said monitors as a single block.

22. In combination, an apparatus for manipulating a plurality of information bits that may be selectively related in a serial and in a parallel sense, means connected to said apparatus to generate a check monitor by modulo $n$ summing of those bits related in a serial sense where $n$ is greater than 2, and means connected to said apparatus to generate a restoration monitor by modulo 2 summing of those bits related in a parallel sense.

23. In combination, an apparatus for manipulating a plurality of information bits that may be selectively related in a parallel and in a serial sense, means connected to said apparatus to generate a check monitor by a modulo $n$ summing of those bits related in a parallel sense where $n$ is greater than 2, and means connected to said apparatus to generate a restoration monitor by modulo 2 summing of those bits related in a serial sense.

24. An information handling apparatus for manipulating a plurality of words, each of which is comprised of a plurality of bits of information, means generating from more than one of said words a restoration monitor which is capable of restoring any one of the words used to generate the same even though it is not identical to any one word, and means actuated upon the sensing of an error in one of said words for generating from said restoration monitor a restored word in errorless form to replace that word found to be in error.

25. In an information data processing system, the improvement of automatic error detection and correction apparatus comprising means for processing a plurality of multi-bit information words, arranged in rows and columns, means for generating a first group of check data in accordance with the bits in each of said rows, means for generating a second group of check data in accordance with the bits in each of said columns, means for utilizing one of said groups of check data to detect and locate an error in the processing of said information words, and means for utilizing the other group of check data for automatically correcting said error without interrupting the operation of said information data processing system.

26. Apparatus for correcting errors occurring in the transfer of a block of digital data within a data processing apparatus comprising means for sensing the digital data after transfer to detect the existence and location of changes in the data from its original form prior to the transfer, means connected to said sensing means for synthesizing correction data from selected characteristics of all of said original digital data in said block and said erroneous digital data in response to the sensing of such a change, and means including said last named means connected to utilize the correction data to alter the transferred data at the sensed error location to restore the data to its original correct form.

References Cited in the file of this patent

UNITED STATES PATENTS

| | | |
|---|---|---|
| Re. 23,601 | Hamming et al. | Dec. 23, 1952 |
| 2,658,188 | Malthaner et al. | Nov. 3, 1953 |
| 2,758,905 | Curtis | Aug. 14, 1956 |
| 2,803,515 | Begun et al. | Aug. 20, 1957 |

OTHER REFERENCES

Richards: Arithmetic Operations in Digital Computers (March 17, 1955), D. Van Nostrand Company, Inc., New York, N.Y., pgs. 187 to 188 relied on.